United States Patent
Huang et al.

(10) Patent No.: US 7,898,609 B2
(45) Date of Patent: Mar. 1, 2011

(54) MULTI-DOMAIN VERTICAL ALIGNMENT LIQUID CRYSTAL DISPLAY HAVING DIELECTRIC MEDIUM WITH NONUNIFORM THICKNESS

(75) Inventors: Shang-Yu Huang, Miao-Li (TW); Chao-Yi Hung, Miao-Li (TW); Tsau-Hua Hsieh, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 704 days.

(21) Appl. No.: 12/005,941

(22) Filed: Dec. 29, 2007

(65) Prior Publication Data
US 2008/0158460 A1 Jul. 3, 2008

(30) Foreign Application Priority Data
Dec. 29, 2006 (TW) .............................. 95149679 A

(51) Int. Cl.
*G02F 1/1368* (2006.01)
(52) U.S. Cl. ..................... 349/43; 349/96; 349/122; 349/123; 349/139
(58) Field of Classification Search ............... 349/43, 349/42, 38, 39, 104, 96, 97, 123, 122, 138, 349/139, 158, 134, 136, 143
See application file for complete search history.

(56) References Cited

U.S. PATENT DOCUMENTS

| 6,424,398 | B1 | 7/2002 | Taniguchi | 349/143 |
| 7,016,001 | B2* | 3/2006 | Tanaka et al. | 349/138 |
| 2003/0174269 | A1* | 9/2003 | Tanaka et al. | 349/129 |
| 2006/0274251 | A1 | 12/2006 | Song et al. | |
| 2008/0158460 | A1* | 7/2008 | Huang et al. | 349/43 |

FOREIGN PATENT DOCUMENTS

| CN | 1126844 A | 7/1996 |
| CN | 1363852 A | 8/2002 |
| EP | 0709718 A2 | 5/1996 |

* cited by examiner

*Primary Examiner*—Brian M Healy
(74) *Attorney, Agent, or Firm*—Wei Te Chung

(57) ABSTRACT

An exemplary MVA LCD (2) includes a first substrate (21), a second substrate (22), and a liquid crystal layer (23) interposed between the two substrates. A common electrode (29) and protrusions (211) are formed at an inner side of the first substrate in order. Gate electrodes (221) and pixel electrodes (222) are formed on an inner side of the second substrate. A patterned gate insulating layer (223) is formed at the second substrate. The patterned gate insulating layer covers the gate electrodes, and a part of each pixel electrode.

18 Claims, 2 Drawing Sheets

MULTI-DOMAIN VERTICAL ALIGNMENT LIQUID CRYSTAL DISPLAY HAVING DIELECTRIC MEDIUM WITH NONUNIFORM THICKNESS

FIELD OF THE INVENTION

The present invention relates to multi-domain vertical alignment liquid crystal displays, and particularly to a multi-domain vertical alignment liquid crystal display having a dielectric medium layer formed on part of a pixel region in order to improve the multi-domain effect.

GENERAL BACKGROUND

A liquid crystal display (LCD) utilizes the optical and electrical anisotropy of liquid crystal molecules to produce an image. The liquid crystal molecules have a particular passive orientation when no voltage is applied thereto. However, in a driven state, the liquid crystal molecules change their orientations according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, orientations of the liquid crystal molecules are changed and a desired image can be produced.

The first type of LCD developed was the TN (twisted nematic) mode LCD. Even though TN mode LCDs have been put into use in many applications, they have an inherent drawback that cannot be eliminated; namely, a very narrow viewing angle. By adding compensation films on TN mode LCDs, this problem can be ameliorated to some extent. However, the cost of the TN mode LCD is increased. Therefore, MVA (multi-domain vertical alignment) mode LCDs have recently been developed. In MVA mode LCDs, each pixel is divided into multiple domains. Liquid crystal molecules of a pixel are vertically aligned when no voltage is applied, and are inclined in different directions according to the domains when a voltage is applied. Thus MVA mode LCDs can provide wide viewing angles. Typical MVA mode LCDs have four domains in a pixel, and employ protrusions and/or slits at the pixels to achieve the desired inclinations of the liquid crystal molecules.

Referring to FIG. 3, a cross-sectional view of part of a typical MVA LCD 1 is shown. The LCD 1 includes a first substrate 11, a second substrate 12 parallel to the first substrate 11, and a liquid crystal layer 13 interposed between the first substrate 11 and the second substrate 12. The liquid crystal layer 13 is made of anisotropic liquid crystal material, and has a negative specific inductive capacity (SIC).

A first polarization film 15 is disposed on an outer surface (not labeled) of the first substrate 11 farthest from the liquid crystal layer 13. A color filter 18 is formed on an inner surface of the first substrate 11 nearest to the liquid crystal layer 13. A common electrode 19 is formed on the color filter 18. A plurality of protrusions 111 are formed on the common electrode 19. A first alignment film 119 covers the common electrode 19 having the protrusions 111.

A second polarization film 16 is disposed on an outer surface (not labeled) of the second substrate 12 farthest from the liquid crystal layer 13. A polarization axis of the first polarization film 15 is perpendicular to a polarization axis of the second polarization film 16. A plurality of thin film transistors (TFTs) (not labeled) and a plurality of pixel electrodes 128 connected to the TFTs are formed on the second substrate 12 generally adjacent to the liquid crystal layer 13. A second alignment film 120 covers the TFTs and the pixel electrodes 128.

Each TFT includes a gate electrode 121, a gate insulating layer 122, a semiconductor layer 123, a source electrode 124, a drain electrode 125, and a passivation layer 126. The gate electrode 121 is formed on the second substrate 12. The gate insulating layer 122 is formed on an entire surface of the second substrate 12 having the gate electrode 121. The semiconductor layer 123 is formed on the gate insulating layer 122, and corresponds to the gate electrode 121. The source electrode 124 and the drain electrode 125 are formed on the semiconductor layer 123. The passivation layer 126 is formed on the gate insulating layer 122, the source electrode 124, the semiconductor layer 123, and the drain electrode 125. The pixel electrode 128 is formed on the passivation layer 126, and is connected to the drain electrode 125 via a contact hole (not labeled) of the passivation layer 126. The pixel electrode 128 has a plurality of recesses 129 corresponding to the plurality of protrusions 111.

When no voltage is applied, the LCD 1 is in an off state, and most of liquid crystal molecules 130 of the liquid crystal layer 13 are aligned perpendicular to the first and second substrates 11, 12. When light beams transmit through the second polarization film 16, only the light beams having the same polarization direction as the second polarization axis can pass through the second polarization film 16. When these light beams transmit through the liquid crystal layer 13, a polarization direction of the light beams is parallel to long axes of the liquid crystal molecules 130, and a polarization state of the light beams does not change. When the light beams transmit through the first polarization film 15, all the light beams are absorbed because the polarization direction of the light beams is perpendicular to the polarization axis of the first polarization film 15. Thus, the LCD 1 is in a black state.

Referring also to FIG. 4, when a voltage is applied, the LCD 1 is in an on state, and an electric field is generated in the liquid crystal layer 13. In general, a direction of the electric field is perpendicular to the two substrates 11, 13. In addition, electric field lines of the electric field at two sides near the protrusions 111 and the recesses 129 are arcuate and symmetrical. Because the liquid crystal molecules 130 are anisotropic and have a negative specific inductive capacity (SIC), most of the liquid crystal molecules 130 are twisted such that long axes of the liquid crystal molecules 130 are perpendicular to the directions of the electric field. When light beams transmit through the liquid crystal layer 13, the light beams are birefracted, and thus polarization states of the light beams change. When the light beams transmit through the first polarization film 15, some light beams can pass through the first polarization film 15, and thus the LCD 1 works in an on state.

In the on state, the protrusions 111 and the recesses 129 cause the directions of the electric field to be various, so that the range of different orientations of the liquid crystal molecules 130 is increased. However, the number of protrusions 111 and recesses 129 is limited because of limitations inherent in the structure of the LCD 1 and the technology used in manufacturing the LCD 1. The limited number of protrusions 111 and recesses 129 means the variety of orientations of the liquid crystal molecules 130 is also limited. The LCD 1 has only a relatively small number of domains. Therefore, when a user views the LCD 1 from various directions, the user is liable to see color shift in the images displayed.

What is needed, therefore, is an MVA LCD that can overcome the above-described deficiencies.

SUMMARY

In one preferred embodiment, an MVA LCD includes a first substrate, a second substrate facing the first substrate, and a liquid crystal layer interposed between the two substrates. A common electrode is formed at an inner side of the first substrate. A plurality of protrusions are formed on the common electrode. Gate electrodes and pixel electrodes are formed on an inner side of the second substrate adjacent to the liquid crystal layer, a patterned gate insulating layer is formed on the second substrate. The patterned gate insulating layer covers the gate electrodes, and a part of each pixel electrode.

Other novel features and advantages of the present MVA LCD will become more apparent from the following detailed description when taken in conjunction with the accompanying drawings. In the drawings, all the views are schematic.

DETAILED DESCRIPTION OF PREFERRED EMBODIMENTS

Figure 1:
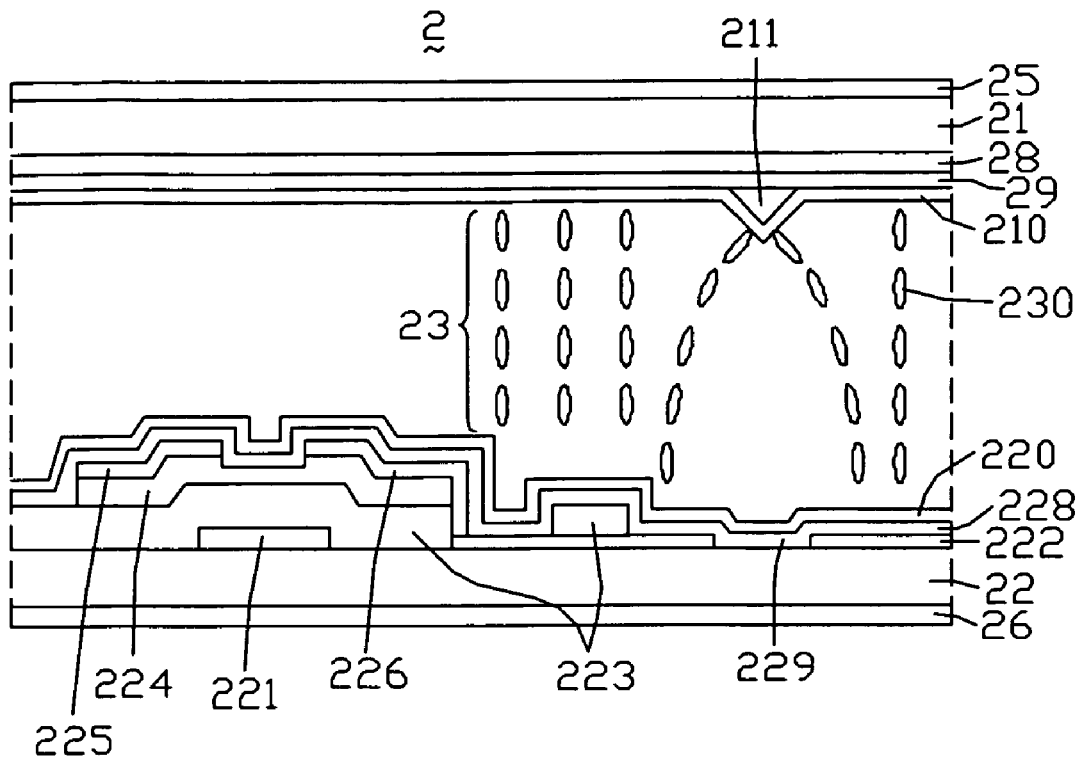
FIG. 1 is a side, cross-sectional view of part of an MVA LCD according to a first embodiment of the present invention, showing the LCD in an off state.

Reference will now be made to the drawing figures to describe various embodiments of the present invention in detail.

Referring to FIG. 1, part of a pixel region of an MVA LCD according to a first embodiment of the present invention is shown. The MVA LCD 2 includes a first substrate 21, a second substrate 22 parallel to the first substrate 21, and a liquid crystal layer 23 interposed between the first substrate 21 and the second substrate 22. The liquid crystal layer 23 is made of anisotropic liquid crystal material, and has a negative specific inductive capacity (SIC).

A first polarization film 25 is disposed on an outer surface (not labeled) of the first substrate 21 farthest from the liquid crystal layer 23. A color filter 28 is formed on an inner surface of the first substrate 21 nearest to the liquid crystal layer 23. A common electrode 29 is formed on the color filter 28. A plurality of protrusions 211 are formed on the common electrode 29. A first alignment film 210 covers the common electrode 29 having the protrusions 211.

A second polarization film 26 is disposed on an outer surface (not labeled) of the second substrate 22 farthest from the liquid crystal layer 23. A polarization axis of the first polarization film 25 is perpendicular to a polarization axis of the second polarization film 26.

In each pixel region, a gate electrode 221 and a pixel electrode 222 are formed on an inner surface (not labeled) of the second substrate 22 generally adjacent to the liquid crystal layer 23. The pixel electrodes 222 include a plurality of recesses 229 corresponding to the plurality of the protrusions 211. In each pixel region, a patterned gate insulating layer 223 is formed on the second substrate 22, the gate electrode 221, and part of the pixel electrode 222. A semiconductor layer 224 is formed on the gate insulating layer 223, corresponding to the gate electrode 221. The semiconductor layer 224 defines a groove (not labeled). A source electrode 225 and a drain electrode 226 are formed on two sides of the groove of the semiconductor layer 224, and the drain electrode 226 is connected to the pixel electrode 222. A passivation layer 228 is formed on the gate insulating layer 223, the semiconductor layer 224, the source electrode 225, the drain electrode 226, and the pixel electrode 222. A second alignment film 220 is formed on the passivation layer 228. The gate electrode 221, the gate insulating layer 223, the semiconductor layer 224, the source electrode 225, and the drain electrode 226 cooperatively define a TFT (not labeled). The TFT, the pixel electrode 222, the common electrode 29, and the liquid crystal layer 13 cooperatively define a pixel region (not labeled). The gate insulating layer 223 is made of silicon oxide ($SiO_2$).

When no voltage is applied, the LCD 2 is in an off state, and most of liquid crystal molecules 230 of the liquid crystal layer 23 are vertically aligned perpendicular to the first and second substrates 21, 22. When light beams transmit through the second polarization film 26, only the light beams having the same polarization direction as the second polarization axis can pass through the second polarization film 26. When these light beams transmit through the liquid crystal layer 23, a polarization direction of the light beams is parallel to long axes of the liquid crystal molecules 230, and a polarization state of the light beams does not change. When the light beams transmit through the first polarization film 25, all the light beams are absorbed because the polarization direction of the light beams is perpendicular to the polarization axis of the first polarization film 25. Thus, the LCD 2 is in a black state.

Figure 2:
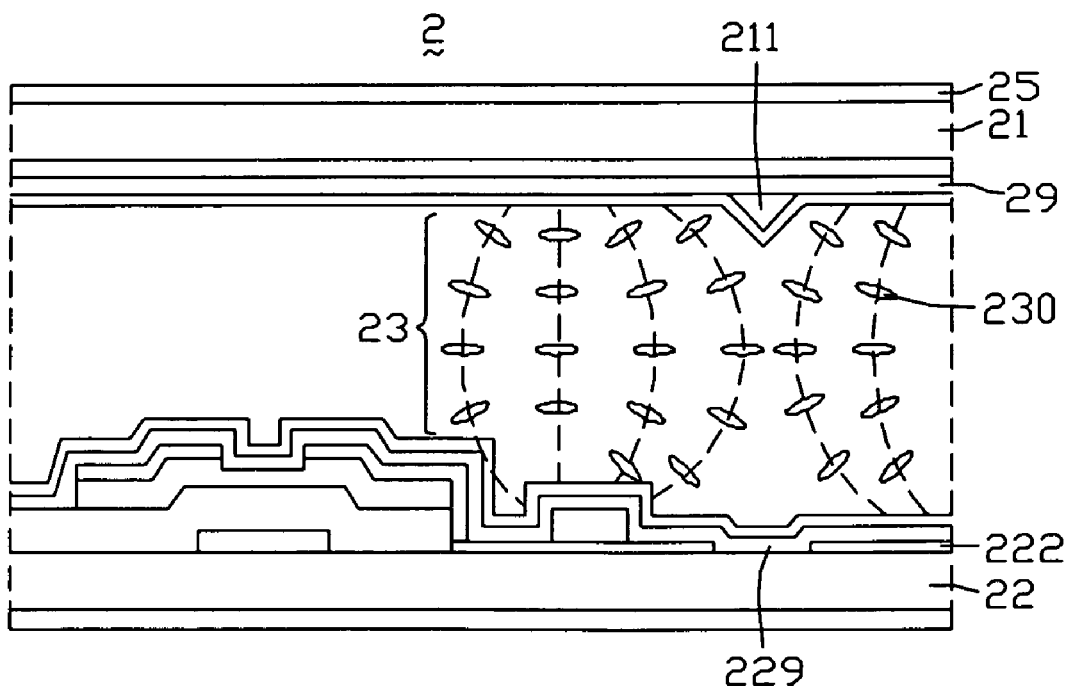
FIG. 2 is similar to FIG. 1, but showing the LCD in an on state.
Figure 3:
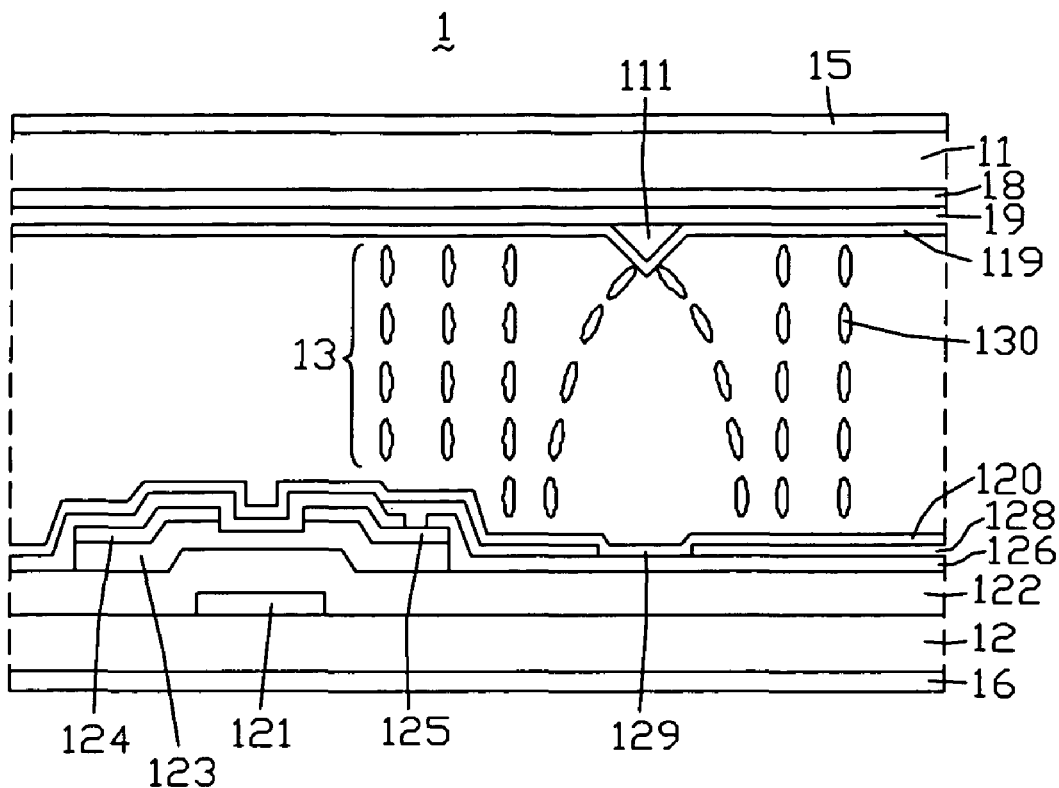
FIG. 3 is a side, cross-sectional view of part of a conventional MVA LCD, showing the LCD in an off state.
Figure 4:
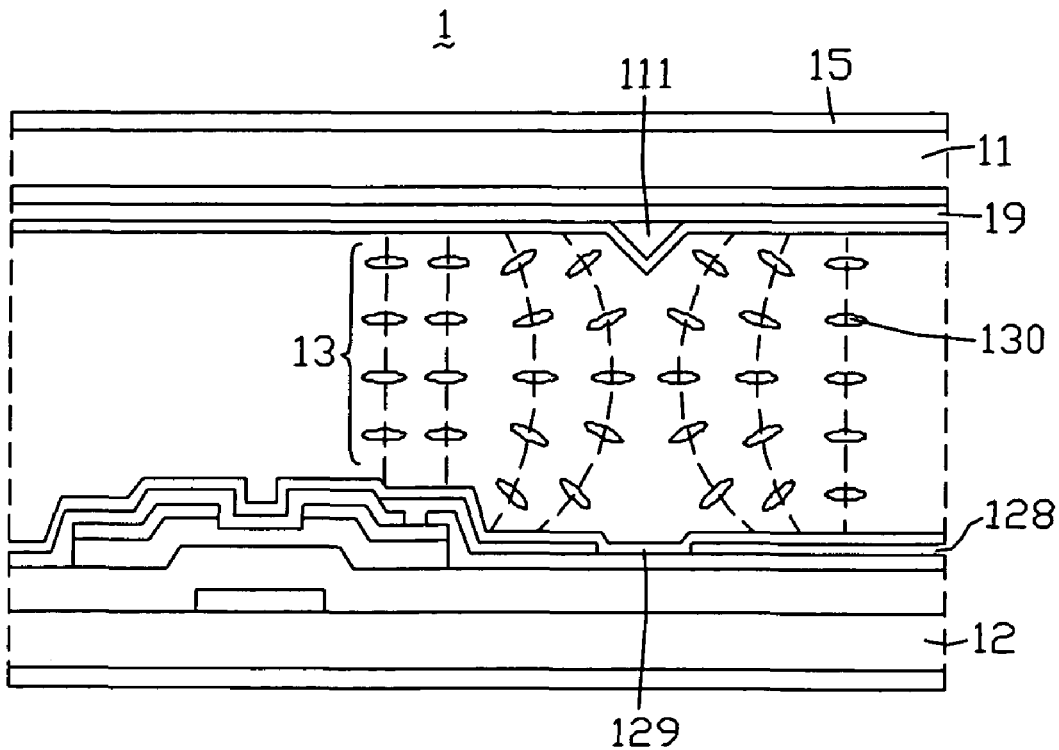
FIG. 4 is similar to FIG. 3, but showing the LCD in an on state.

Referring also to FIG. 2, when a voltage is applied, the LCD 2 is in an on state, and an electric field is generated in the liquid crystal layer 23. The electric field near the protrusions 211 and the recesses 229 is affected by the protrusions 211 and the recesses 229, and electric field lines of the electric field near the protrusions 211 and the recesses 229 are arcuate. Further, in each pixel region, part of the gate insulating layer 223 is located on part of the pixel electrode 222 near the recess 229. This part of the gate insulating layer 223 functions as a dielectric medium layer. The electric field is affected by the dielectric medium layer. The strength of the electric field corresponding to the dielectric medium layer is weaker than strength of the electric field corresponding to other parts of the pixel electrode 222. Thus, the electric field at two opposite sides of the protrusions 211 and the recesses 229 is asymmetrical. Because the liquid crystal molecules 230 have negative dielectric anisotropy, most of the liquid crystal molecules 230 are twisted such that long axes of the liquid crystal molecules 230 are perpendicular to the directions of the electric field. When light beams transmit through the liquid crystal layer 23, the light beams are birefracted, and thus polarization states of the light beams change. When the light beams transmit through the first polarization film 25, some light beams can pass through the first polarization film 25. Thus, the LCD 2 works in an on state.

In summary, each of the pixel regions of the LCD 2 is divided into several domains by the protrusions 211 and the recesses 229, such that different electric field lines are generated. Furthermore, because the strength of the electric field is affected by the dielectric medium layer located on part of the pixel electrode 222, the electric field at two sides of the protrusions 211 and the recesses 229 is asymmetrical. The electric field lines are many and various, so that the number of different orientations of the liquid crystal molecules 230 is increased. Therefore, the color performance of the MVA LCD 2 is improved.

In further and/or alternative embodiments, a dielectric medium layer can be provided on part of the pixel electrode at each pixel, with the dielectric medium layer not being part of the patterned gate insulating layer 223. That is, the dielectric medium layer can be made of a material different from the material of the gate insulating layer 223.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-domain vertical alignment (MVA) liquid crystal display (LCD), comprising:
    a first substrate;
    a common electrode formed at an inner side of the first substrate;
    a plurality of protrusions formed on the common electrode;
    a second substrate parallel to the first substrate;
    a liquid crystal layer between the two substrates;
    a plurality of gate electrodes and pixel electrodes formed at an inner side of the second substrate; and
    a patterned gate insulating layer formed at the inner side of the second substrate, the patterned gate insulating layer covering the gate electrodes, and a part of each pixel electrode.

2. The MVA LCD as claimed in claim 1, wherein the pixel electrodes comprise a plurality of recesses corresponding to the plurality of protrusions.

3. The MVA LCD as claimed in claim 2, wherein a passivation layer is formed on the thin film transistors and the pixel electrodes.

4. The MVA LCD as claimed in claim 3, further comprising a first alignment film formed on the common electrode and the protrusions.

5. The MVA LCD as claimed in claim 4, further comprising a second alignment film formed on the passivation layer.

6. The MVA LCD as claimed in claim 1, further comprising a first polarization film disposed at an outer side of the first substrate.

7. The MVA LCD as claimed in claim 6, further comprising a second polarization film disposed at an outer side of the second substrate.

8. The MVA LCD as claimed in claim 7, wherein a polarization axis of the first polarization film is perpendicular to a polarization axis of the second polarization film.

9. The MVA LCD as claimed in claim 1, further comprising a color filter formed between the first substrate and the common electrode.

10. The MVA LCD as claimed in claim 1, further comprising a semiconductor layer, a source electrode, and a drain electrode formed at each of the gate electrodes, wherein the semiconductor layer defines a groove, and the source electrode and the drain electrode are formed on the semiconductor layer at two sides of the groove.

11. The MVA LCD as claimed in claim 10, wherein the drain electrode is connected to a corresponding one of the pixel electrodes.

12. The MVA LCD as claimed in claim 1, wherein the gate insulating layer is made of silicon oxide ($SiO_2$).

13. A multi-domain vertical alignment (MVA) liquid crystal display (LCD), comprising:
    a first substrate;
    a common electrode formed at an inner side of the first substrate;
    a plurality of protrusions formed on the common electrode;
    a second substrate parallel to the first substrate;
    a liquid crystal layer between the two substrates; and
    a plurality of thin film transistors and pixel electrodes formed at an inner side of the second substrate, wherein each of the thin film transistors, a corresponding one of the pixel electrodes, the common electrode, and the liquid crystal layer define a pixel, and a dielectric medium layer is formed at the pixel electrode, the dielectric medium layer configured to facilitate the generation of an electric field having various electric field lines when a voltage is applied to the pixel.

14. The MVA LCD as claimed in claim 13, wherein each of the thin film transistors comprises a gate electrode and a gate insulating layer formed at the inner side of the second substrate, a semiconductor layer formed on the gate insulating layer corresponding to the gate electrode, a source electrode, and a drain electrode.

15. The MVA LCD as claimed in claim 14, wherein the dielectric medium layer is made from a same material as the gate insulating layer.

16. The MVA LCD as claimed in claim 15, wherein the dielectric medium layer is made from silicon oxide ($SiO_2$).

17. The MVA LCD as claimed in claim 13, further comprising a first alignment film formed on the common electrode.

18. The MVA LCD as claimed in claim 17, further comprising a passivation layer formed on the thin film transistors and the pixel electrodes, and a second alignment film formed on the passivation layer.

* * * * *

UNITED STATES PATENT AND TRADEMARK OFFICE
CERTIFICATE OF CORRECTION

PATENT NO. : 7,898,609 B2
APPLICATION NO. : 12/005941
DATED : March 1, 2011
INVENTOR(S) : Shang-Yu Huang et al.

It is certified that error appears in the above-identified patent and that said Letters Patent is hereby corrected as shown below:

On the title page item [73] should read

-- (73) Assignees: Chimei Innolux Corporation, Miao-Li County (TW). --

Signed and Sealed this
Seventh Day of June, 2011

David J. Kappos
*Director of the United States Patent and Trademark Office*